(12) United States Patent
Lin et al.

(10) Patent No.: US 7,353,702 B2
(45) Date of Patent: Apr. 8, 2008

(54) TIRE VALVE HAVING INDICATING DEVICE

(76) Inventors: Yen-Ching Lin, 5F., No. 137, Pingding Rd., Danshuei Township, Taipei County 251 (TW); Yuan-Chun Lin, 5F., No. 137, Pingding Rd., Danshuei Township, Taipei County 251 (TW)

( * ) Notice: Subject to any disclaimer, the term of this patent is extended or adjusted under 35 U.S.C. 154(b) by 0 days.

(21) Appl. No.: 11/418,033

(22) Filed: May 5, 2006

(65) Prior Publication Data

US 2007/0256488 A1     Nov. 8, 2007

(51) Int. Cl.
*G01M 17/02* (2006.01)
(52) U.S. Cl. ........................................ 73/146; 137/227
(58) Field of Classification Search ................ 73/146, 73/146.8; 137/227
See application file for complete search history.

(56) References Cited

U.S. PATENT DOCUMENTS

| | | | | |
|---|---|---|---|---|
| 3,863,697 A | * | 2/1975 | Brown | 152/427 |
| 3,978,448 A | * | 8/1976 | Vago | 340/445 |
| 4,136,560 A | * | 1/1979 | Gellos | 73/146.8 |
| 5,703,670 A | * | 12/1997 | Callard | 351/123 |
| 5,837,891 A | * | 11/1998 | Bridge | 73/146.8 |
| D410,874 S | * | 6/1999 | Zastudil | D12/153 |

* cited by examiner

*Primary Examiner*—Andre J. Allen
(74) *Attorney, Agent, or Firm*—Troxell Law Office, PLLC

(57) ABSTRACT

A valve for a tire with a simple structure and a low cost is easily made for monitoring the pressure of the tire through an indicator.

15 Claims, 7 Drawing Sheets

TIRE VALVE HAVING INDICATING DEVICE

FIELD OF THE INVENTION

The present invention relates to a valve; more particularly, relates to monitoring a tire pressure at any time with an easily fabricated and assembled tire valve having a reduced cost.

DESCRIPTION OF THE RELATED ARTS

As disclosed in U.S. Pat. No. 5,103,670, "Tire valve and pressure gauge", a first prior art comprises a housing being engaged within a tire valve stem; a bellows being engaged within the housing and functioning to produce movement of a portion upon exposure, where the bellows is in pneumatic communication with the air pressure within the tire and is cylindrical in shape and formed for compressible movement along the central axis, and Where a calibrated spring is disposed within the bellows and is operable to balance the movement of the bellows caused by the changing tire pressure; and a driving rod being formed with a first end and a second end, where the first end of the driving rod is engaged to the bellows and the second end of the driving rod has a rotational engagement means and the driving rod is slidably engaged within the housing, such that movement of the bellows results in axial movement of the driving rod along the linear central axis. The combination of the first prior art is formed to be substantially the same size as a general tire valve stem, such that it may be used as a replacement part. A window is formed in the tire stem to permit viewing of the pressure indicator, whereby different numerals corresponding to different tire pressures become visible in the window upon rotation of the indicator which is caused by movement of the bellows. An air channel is formed through the device to permit air to be pumped into the tire. A rotary indicator having an internal spiral groove rotates upon a driving rod formed with projecting driving pin members that project into the spiral groove to cause the rotation of the indicator.

A second prior art is disclosed in U.S. Pat. No. 5,103,670, "Tire valve and pressure gauge", comprising a bracket structure mounted to a rim of a wheel assembly and extending inwardly from the rim of the wheel assembly toward a hub of the wheel assembly such that the bracket structure does not protrude from the wheel assembly; at least one air pressure gauge mounted to the bracket structure distal from the rim of the wheel assembly such that the at least one air pressure gauge does not protrude from the wheel assembly; and a pneumatic conduit being in communication with the at least one air pressure gauge and a valve stem of a pneumatic tire. The second prior art includes a pair of the analog/digital readout pressure gauges and associated valve stems for individually monitoring and pressurizing the tire or tires of the wheel assembly. The tire pressure indication system may be attached to the outside wheel of a dual wheel assembly by the bracket structure with an adhesive tape or other suitable fastener. The tire pressure indication system provides can be easily mounted to the wheel tire assembly without the use of a hubcap or other similar mounting structure.

The above two prior arts can be used for monitoring the tire pressure of a tire; yer, the costs are high, the structures are complicated, and they are not used with ease. There are still some other prior arts having one or some of the following shortages: complicated fabrication, bad measurement precision, complex circuits, and recharge-required power supplier. Hence, the prior arts do not fulfill users' requests on actual use.

SUMMARY OF THE INVENTION

The main purpose of the present invention is to depose a movable indicating device in a bushing to monitor a tire pressure at any time.

Another purpose of the present invention is to obtain a valve with simple structure which is easily fabricated with a reduced cost.

To achieve the above purposes, the present invention is a tire valve having an indicating device, comprising a bushing fixed to a tire inlet of a tire, where the bushing has an air-pumping mouth at an end and a window is deposed at a proper position of the bushing; and an indicating device movably deposed in the bushing between the tire inlet and the air-pumping mouth, where the indicating device comprises a bag filled with a required gas or having a bag inlet, a folding part connected with the bag, and an indicator deposed on the folding part, and where the indicator is corresponding to the window. Accordingly, a novel tire valve having an indicating device is obtained.

BRIEF DESCRIPTIONS OF THE DRAWINGS

The present invention will be better understood from the following detailed descriptions of the preferred embodiments according to the present invention, taken in conjunction with the accompanying drawings, in which FIG. 1 is a cross-sectional view showing a first preferred embodiment according to the present invention;

DESCRIPTION OF THE PREFERRED EMBODIMENTS

The following descriptions of the preferred embodiments are provided to understand the features and the structures of the present invention.

Figure 1:
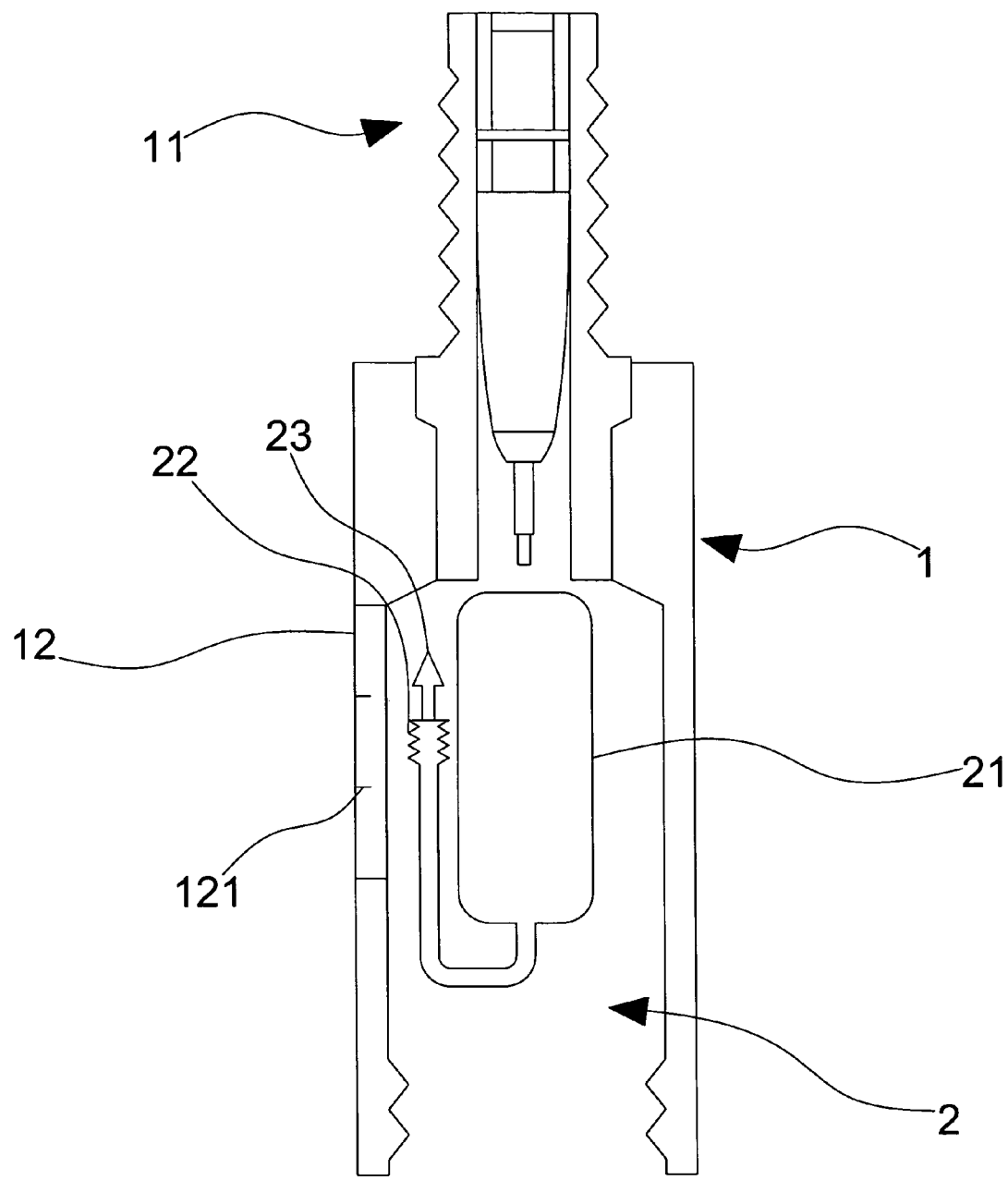

Please refer to FIG. 1, which is a cross-sectional view showing a first preferred embodiment according to the present invention. As shown in the figure, the present invention is a tire valve having an indicating device, comprising a bushing 1 and an indicating device 2, where a tire pressure is monitored with an easily fabricated and assembled tire valve having a reduced cost.

The bushing 1 has an air-pumping mouth 11 at an end, and a window 12 deposed at a proper position at a side; and, a required pump mark 121 is marked on the window 12.

The indicating device 2 is movably deposed in the bushing 1, comprising a bag 21 filled with a required gas; a folding part 22 connected with the bag 21; and an indicator 23 deposed on the folding part 22, where the indicator 23 is corresponding to the window 12.

Hence, a novel tire valve having an indicating device is obtained.

Figure 2A:
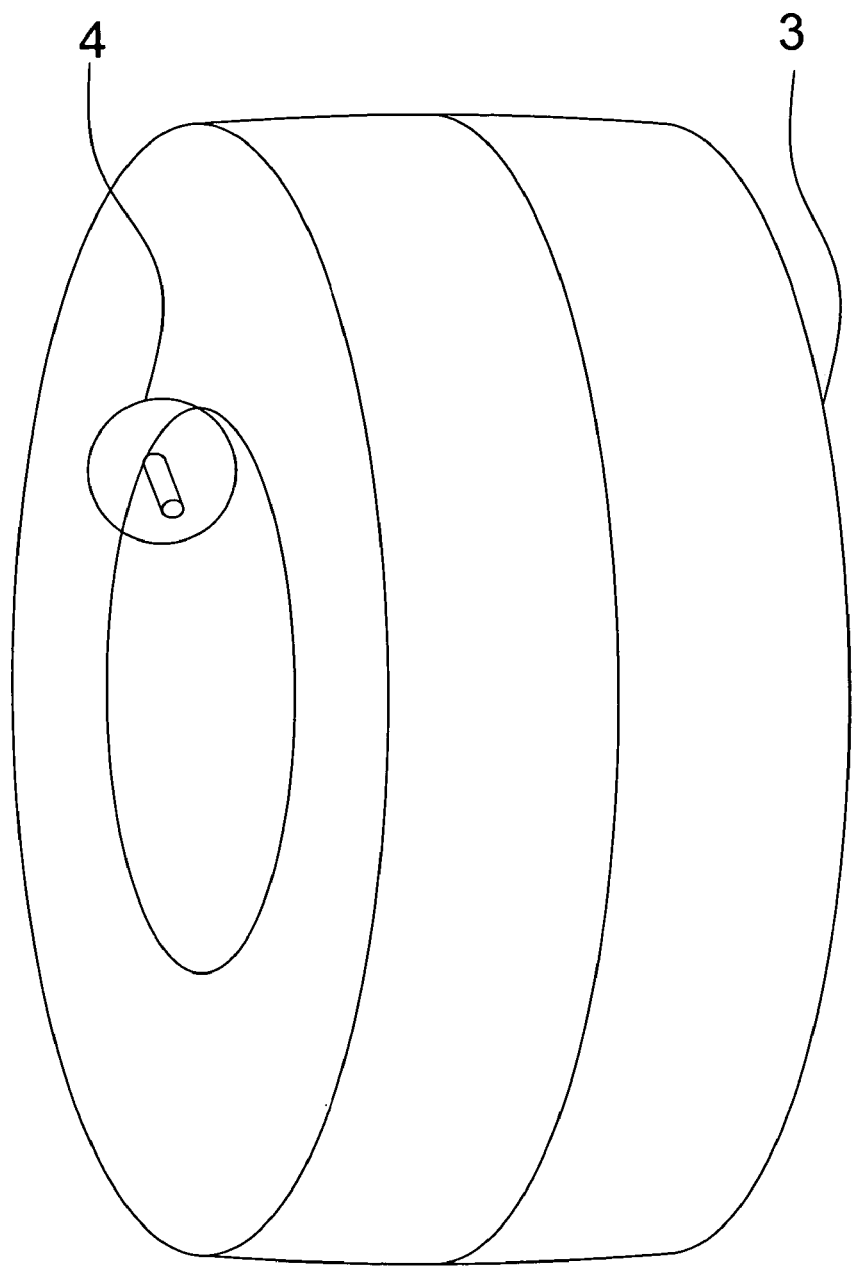
FIG. 2A is a view showing a state of use of the first preferred embodiment according to the present invention.
Figure 2B:
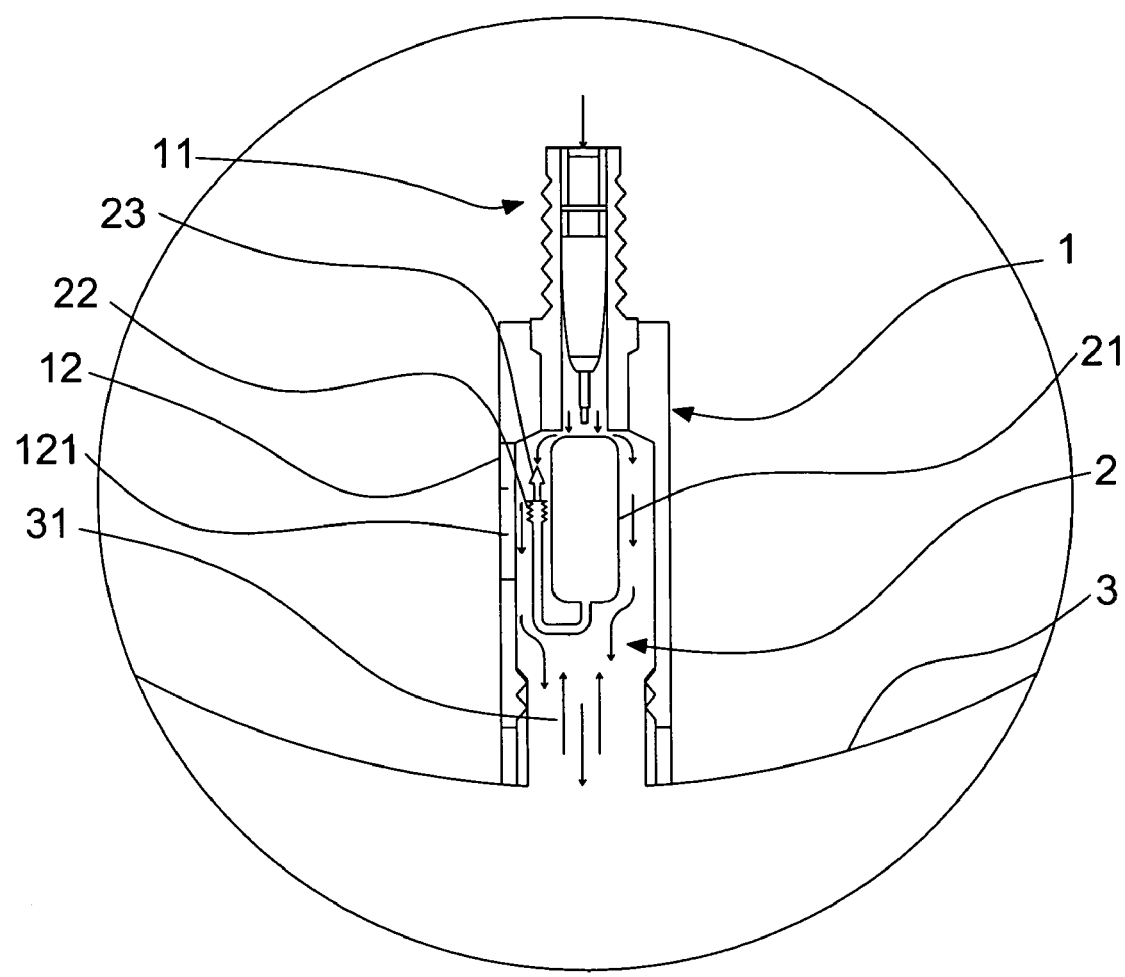
FIG. 2B is a cross-sectional view showing a partial enlargement of FIG. 2A according to the first preferred embodiment of the present invention.

Please refer to FIG. 2A and FIG. 2B, which are a view showing a state of use and a cross-sectional view showing a partial enlargement of FIG. 2A, according to the first preferred embodiment of the present invention. As shown in the figures, the present invention is applied to a tire 3, where, as shown in FIG. 2B, which shows a partial enlargement 4 of FIG. 2A, a bushing 1 is fixed to a tire inlet 31 of the tire 3; and, an indicating device 2 is movably deposed in the bushing 1 between the tire inlet 31 and an air-pumping mouth 11 at an end of the bushing 1.

When a gas is pumped into the tire 3 through the air-pumping mouth 11 the gas enters from the tire inlet 31 into the tire 3 through the bushing 1 for pumping the tire 3 with the gas. When the gas pressure of the tire 3 becomes equal to that of the bag 21 of the indicating device 2, which means the gas pressures are balanced in between, an indicator 23 of the indicating device 2 indicates at a position below a pump mark 121 on a window 12 of the indicating device 2. When the gas in the tire 3 leaks, the gas pressure in the tire 3 becomes smaller than that in the bag 21. Because a result of multiplying the number of the gas pressure and that of the size of the bag 21 is a constant, a folding part 22 connected with the bag 21 is raised by the change in the size of the bag 21 caused by the change in the size of the tire 3; and, so, the indicator 23 of the indicating device 2 deposed on the folding part 22 indicates at a position above the pump mark 121 to warn a driver over an insufficient tire pressure.

Figure 3:
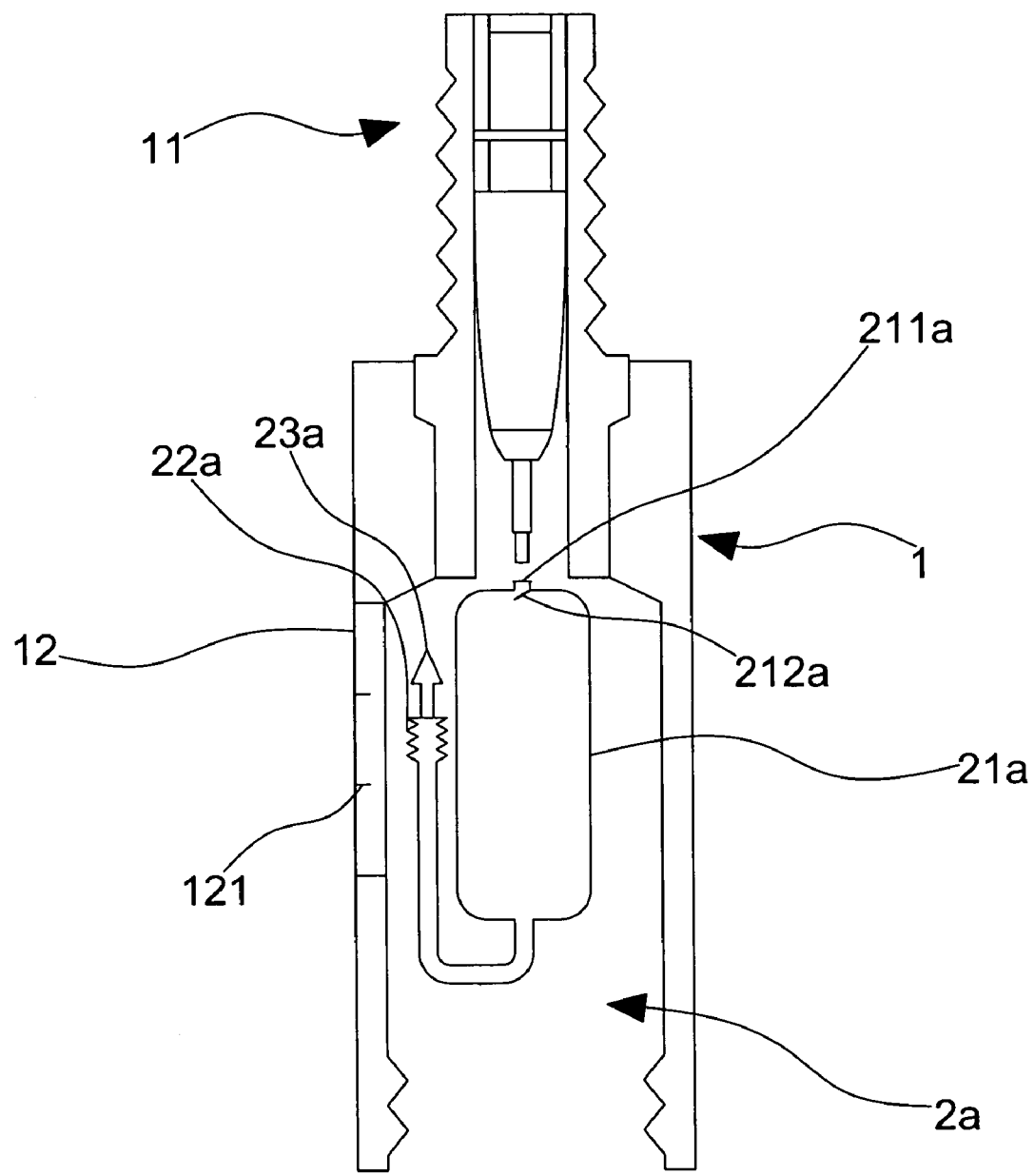
FIG. 3 is a cross-sectional view showing a second preferred embodiment according to the present invention.

Please refer to FIG. 3, which is a cross-sectional view showing a second preferred embodiment according to the present invention. As shown in the figure, the indicating device 2a is movably deposed in the bushing 1, comprising a bag 21a having a bag inlet 211a; a folding part 22a connected with the bag 21a; and an indicator 23a deposed on the folding part 22a, where the indicator 23 is corresponding to the window 12 and the bag inlet 211a has a membrane 212a.

Figure 4A:
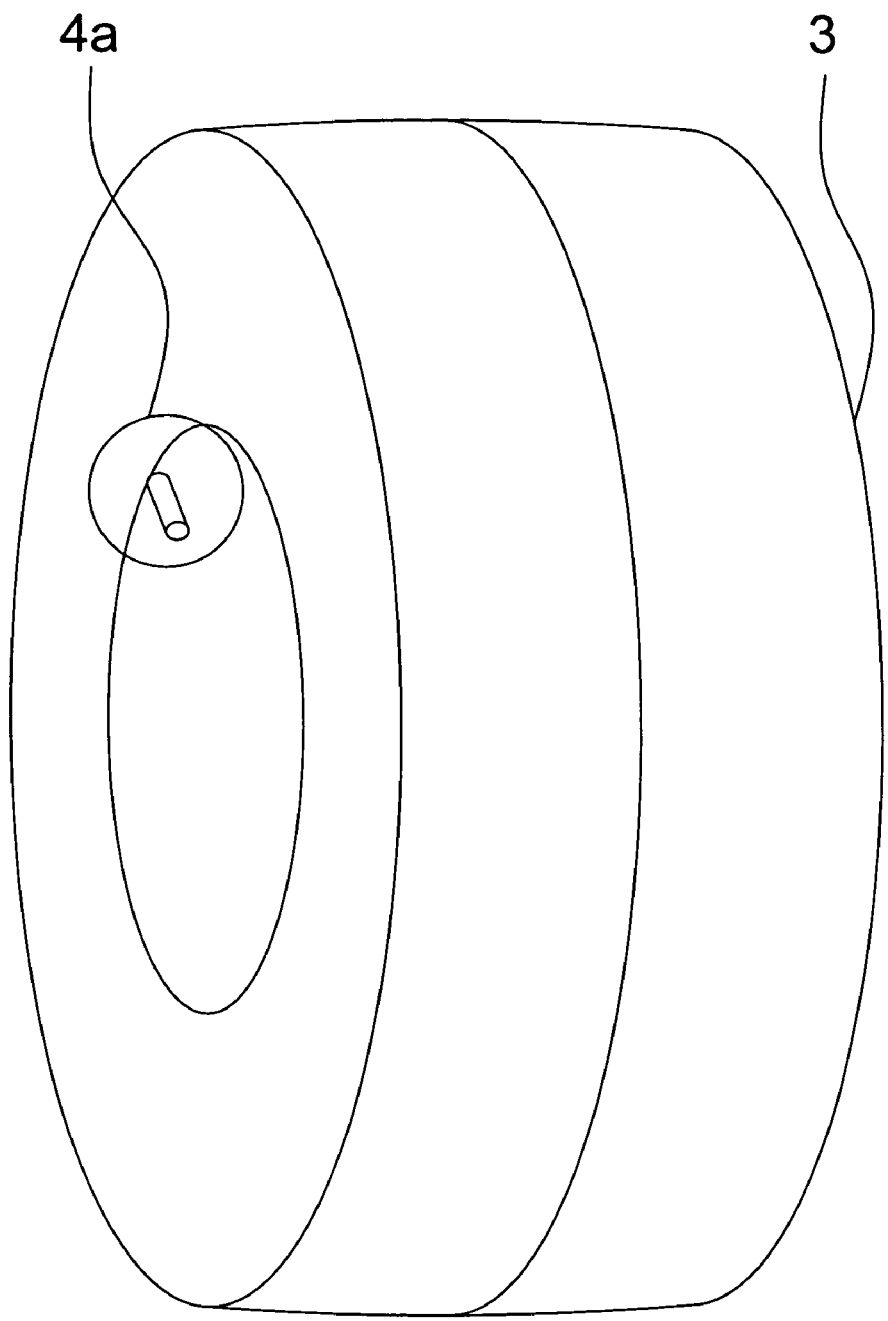
FIG. 4A is a view showing a state of use of the second preferred embodiment according to the present invention.
Figure 4B:
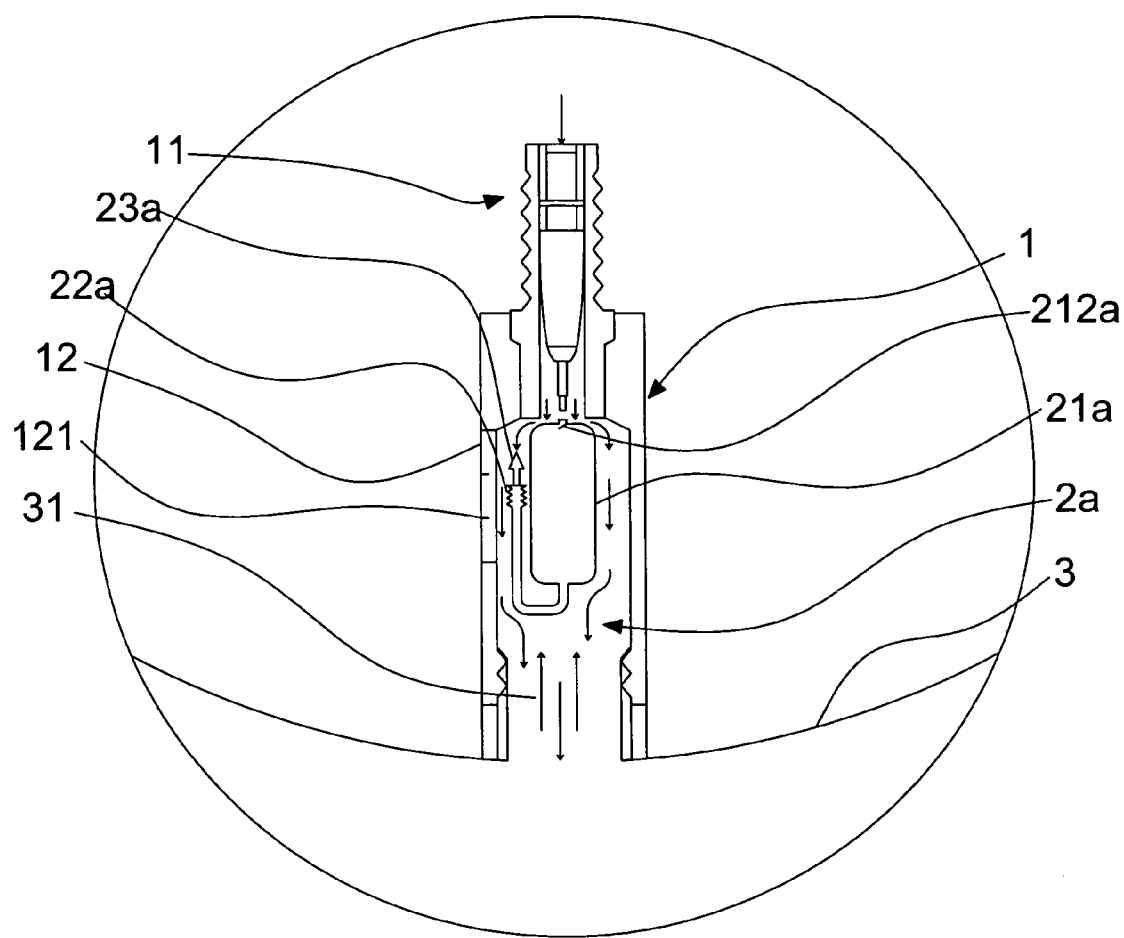
FIG. 4B is a cross-sectional view showing a partial enlargement of FIG. 4A according to the second preferred embodiment of the present invention.

Please refer to FIG. 4A and FIG. 4B, which are a view showing a state of use and a cross-sectional view showing a partial enlargement of FIG. 4A, according to the second preferred embodiment of the present invention. As shown in the figures, the present invention is applied to a tire 3, where, as shown in FIG. 4B, which shows a partial enlargement 4 of FIG. 4A, a bushing 1 is fixed to a tire inlet 31 of the tire 3; and, an indicating device 2a is movably deposed in the bushing 1 between the tire inlet 31 and an air-pumping mouth 11 at an end of the bushing 1.

When a gas is pumped into the tire 3 through the air-pumping mouth 11, the gas enters from the tire inlet 31 into the tire 3 through the bushing 1 for pumping the tire 3 with the gas. Meanwhile, a part of the gas enters into the bag 21a. When the gas pressure of the tire 3 becomes equal to that of the bag 21a of the indicating device 2a and the gas is prevented from leaking out of the bag 21a by closing the membrane 212a, which means the gas pressures are balanced between the bag 21a and the tire 3, an indicator 23a of the indicating device 2a indicates at a position below a pump mark 121 on a window 12 of the indicating device 2a. When the gas in the tire 3 leaks, the gas pressure in the tire 3 becomes smaller than that in the bag 21a and a folding part 22a connected with the bag 21a is raised by the change in the size of the bag 21a caused by the change in the size of the tire 3. As a result, the indicator 23a of the indicating device 2a indicates at a position above the pump mark 121 on the window 12 to warn a driver over an insufficient tire pressure.

Figure 5:
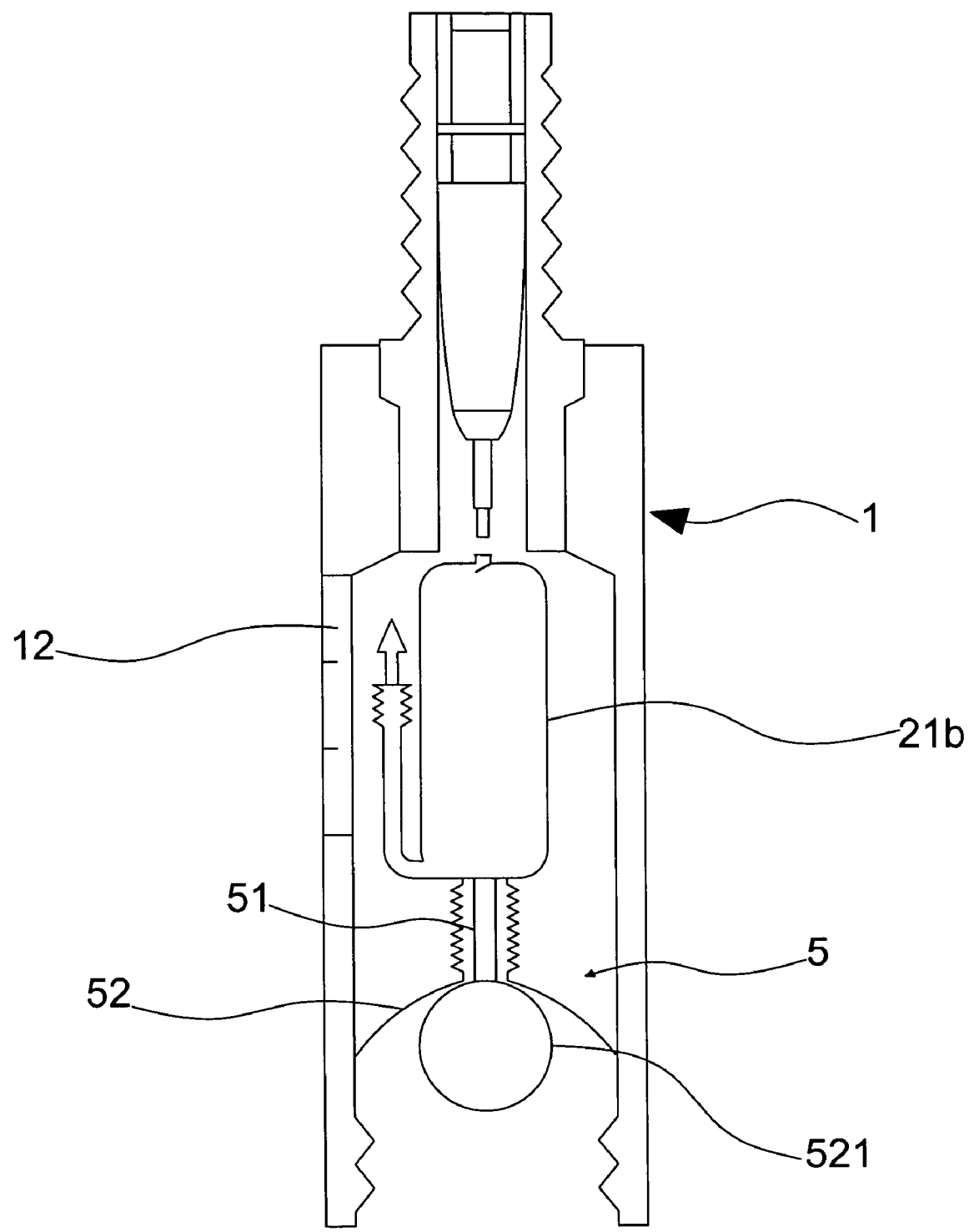
FIG. 5 is a cross-sectional view showing a third preferred embodiment according to the present invention.

Please refer to FIG. 5, which is a cross-sectional view showing a third preferred embodiment according to the present invention. As shown in the figure, a leakage-preventing device 5 is deposed beyond a bag 21b in a bushing 1. The leakage-preventing device 5 comprises a valve stem 51; a valve seat 52 connected with the bag 21b with a spring; and a valve ball 521 in the valve seat 52 connected with the bag 21b with the stem 51. When a leakage happens to a window 12 of the bushing 1 and so a gas pressure outside of the bag 21b is reduced rapidly, the valve seat 52 is shut by the valve ball 521 to prevent the gas from leaking out. On the contrary, under a normal situation, the valve ball 521 is pushed down to open the valve seat 52 for communicating the gas.

To sum up, the present invention is a tire valve having an indicating device, where a tire pressure can be monitored at any time with an easily fabricated and assembled tire valve having a reduced cost.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A tire valve having an indicating device, comprising:
   a bushing, said bushing having
   an air-pumping mouth, and
   a window; and
   an indicating device,
   wherein said bushing is fixed to a tire inlet of a tire;
   wherein said air-pumping mouth is deposed at an end of said bushing opposite to said tire inlet;
   wherein said window is deposed on said bushing; and
   wherein said indicating device is movably deposed in said bushing between said tire inlet and said air-pumping mouth; and
   wherein said indicating device is corresponding to said window,
      wherein said indicating device comprises a bag, a folding part and an indicator;
      wherein said bag is filled with a gas, said folding part is both connected with said bag and adjacent to said bag, and said indicator is deposed on said folding part.

2. The valve stem according to claim 1,
   wherein said window is deposed at a side of said bushing; and
   wherein said window has a pump mark.

3. The valve stem according to claim 1,
   wherein said bag has a bag inlet.

4. The valve stem according to claim 3,
   wherein said bag inlet has a membrane.

5. The valve stem according to claim 1,
   wherein, at the other end of said bushing, a leakage-preventing device is deposed beyond said bag.

6. The valve stem according to claim 5,
   wherein said leakage-preventing device comprises a valve stem; a valve seat connected with said bag through a spring; and a valve ball in said valve seat connected with said bag with said valve stem.

7. A tire valve having an indicating device, comprising:
   a bushing, said bushing having
   an air-pumping mouth, and
   a window; and an indicating device, said indicating device comprising
   a bag,
   a folding part, and
   an indicator,
wherein said bushing is fixed to a tire inlet of a tire;
wherein said air-pumping mouth is deposed at an end of said bushing opposite to said tire inlet;
wherein said window is deposed on said bushing;
wherein said indicating device in said bushing is movably deposed between said tire inlet and said air-pumping mouth and said indicating device is corresponding to said window; and
wherein said bag having no inlet is filled with a gas, said folding part is both connected with said bag and adjacent to said bag, and said indicator is deposed on said folding part.

8. The valve stem according to claim 5,
wherein said window is deposed at a side of said bushing; and
wherein said window has a pump mark.

9. The valve stem according to claim 7,
wherein, at the other end of said bushing, a leakage-preventing device is deposed beyond said bag.

10. The valve stem according to claim 9,
wherein said leakage-preventing device comprises a valve stem; a valve seat connected with said bag through a spring; and a valve ball in said valve seat connected with said bag with said valve stem.

11. A tire valve having an indicating device, comprising:
a bushing, said bushing having
an air-pumping mouth, and
a window; and
an indicating device, said indicating device comprising
   a bag,
   a folding part, and
   an indicator,
wherein said bushing is fixed to a tire inlet of a tire;
wherein said air-pumping mouth is deposed at an end of said bushing opposite to said tire inlet;
wherein said window is deposed on said bushing;
wherein said indicating device in said bushing is movably deposed between said tire inlet and said air-pumping mouth and said indicating device is corresponding to said window; and
wherein said bag has a bag inlet, said folding part is both connected with said bag and adjacent to said bag, and said indicator is deposed on said folding part.

12. The valve stem according to claim 7,
wherein said window is deposed at a side of said bushing; and
wherein said window has a pump mark.

13. The valve stem according to claim 7,
wherein said bag inlet has a membrane.

14. The valve stem according to claim 11,
wherein, at the other end of said bushing, a leakage-preventing device is deposed beyond said bag.

15. The valve stem according to claim 14,
wherein said leakage-preventing device comprises a valve stem; a valve seat connected with said bag through a spring; and a valve ball in said valve seat connected with said bag with said valve stem.

* * * * *